United States Patent Office

Re. 24,573
Reissued Dec. 9, 1958

24,573

ACID NEUTRALIZING ABRASIVE CHLOROPHYLL DENTIFRICE

Benjamin Gruskin, Atlantic City, N. J., deceased, by Rystan Company, Mount Vernon, N. Y., assignee No Drawing. Original No. 2,773,802, dated December 11, 1956, Serial No. 214,628, March 8, 1951. Application for reissue August 29, 1957, Serial No. 682,561

9 Claims. (Cl. 167—93)

Matter enclosed in heavy brackets [ ] appears in the original patent but forms no part of this reissue specification; matter printed in italics indicates the additions made by reissue.

This invention relates to a therapeutic dentifrice; and more particularly to a therapeutic dentifrice containing water soluble chlorophyll, an abrasive constituent, a suitable detergent and an acid neutralizing substance which may either be the abrasive or may be in addition to the abrasive.

A common dental ailment is gingivitis in its various forms, commonly indicated by red, swollen and bleeding gums. It has been estimated that from 80 to 95% of the population have this disease at one time or another.

The present invention provides a therapeutic toothpaste which is particularly advantageous in the treatment of gingivitis, while also having general utility as a toothpaste.

The therapeutic toothpaste of the present invention includes water-soluble chlorophyll in amounts ranging from 0.02% to 3%. The water-soluble chlorophyll is combined with other ingredients in the toothpaste, including an effective detergent and an abrasive, and the paste includes antacid or acid-neutralizing ingredients, which may be the abrasive or which may be in addition to the abrasive, and which maintain the paste at a relatively high pH. The usual hygroscopic materials such as glycerin and thickening materials such as a gum and flavoring material may also be advantageously used.

The presence of an effective detergent and abrasive is important, and the presence of an effective acid neutralizing ingredient is also important, making the resulting chlorophyll-containing dentifrice a particularly effective therapeutic dentifrice.

The detergent used in the dentifrice may be soap or a detergent such as the salts of the sulfonated alcohols. The abrasive is advantageously an alkaline or acid neutralizing abrasive such as calcium carbonate, magnesium carbonate, [insoluble sodium meta-phosphate,] or other acid neutralizing abrasives. Hygroscopic materials such as glycerin and a thickening agent such as a gum are also advantageously used.

The water-soluble chlorophyll used is advantageously a chlorophyllin salt such as sodium or potassium magnesium chlorophyllin, sodium or potassium copper chlorophyllin, sodium or potassium iron chlorophyllin, or combinations of the sodium and potassium salts. These chlorophyllin salts are water-soluble derivatives of chlorophyll "a" ($C_{55}H_{72}O_5N_4Mg$). These chlorophyllin salts are soluble in water but are precipitated from their solutions by acid if the pH falls sufficiently low, e. g., below about pH 5. These water-soluble chlorophyll compounds are used in the dentifrice which is adjusted to maintain a sufficiently high pH, above that at which the chlorophyll is precipitated.

The chlorophyllin salt, e. g. sodium magnesium chlorophyllin or sodium copper chlorophyllin, is advantageously used in a relatively high state of purity, e. g. having a purity around 70% to 90% or greater. If relatively less pure chlorophyll compounds are used, e. g. a product containing 15% water soluble chlorophyllin salt, a correspondingly greater amount will be required to supply sufficient water-soluble chlorophyll to the dentrifrice.

The relative proportions of the various ingredients of the dentifrice may vary considerably, so long as a substantial amount of water-soluble chlorophyll is present. Thus, amounts of chlorophyll as small as 0.02% have been found sufficient to contribute therapeutic and cell-stimulating properties. Advantageously, however, the amount of water-soluble chlorophyll included in the dentifrice is of the order of 0.1% or 0.2% based on the total weight of the toothpaste. In some cases, improved results are obtained where the quantity of chlorophyll is increased to an amount of the order of 3%. On the other hand, the use of large amounts does not greatly increase the therapeutic effect as compared with quantities of the order of from about 0.2% to about 3%, based on the weight of the oral preparation.

The therapeutic toothpaste of the present invention has been found to have important advantages. It is particularly effective as a mouth deodorant, effectively deodorizing the oral cavity.

The new therapeutic tooth paste is also particularly effective in the treatment of gingival conditions, such as tenderness, bleeding and engorgement of gum tissues, and effectively clears up the odors arising from gingival conditions. These gingival conditions, if uncontrolled, are the precursors of pyorrhea, to which a far greater loss of teeth is attributed than to tooth decay. In serious cases of gingivitis, dental surgery may be required; but the new toothpaste is a valuable adjunct to such dental surgery. In many cases of gingivitis, use of the new toothpaste alone will clear up gingival conditions when employed in the normal routine of the user, being in this respect a unique and long-sought toothpaste.

The new therapeutic dentifrice, with its water-soluble chlorophyll combined with effective detergent, abrasive and acid neutralizing ingredients, accomplishes over-all therapeutic effects in the oral cavity in a particularly effective manner. Thus, there are numerous small pockets and interproximal spaces which harbor debris and bacteria and provide localized sources for the breeding of infection which must be cleared up if overall dental health is to be accomplished. The new toothpaste is effective in the treatment of such pockets and spaces and in clearing up the sources of such infection.

Likewise, in the oral cavity, the continual flow of saliva deposits a coating of mucus which prevents therapeutic agents from reaching the areas in which its effects are required. It is necessary to reach and exert an effect on all the spaces which lie beneath the mucus coating to accomplish a therapeutic result. The new therapeutic toothpaste is effective in removing such coatings and in accomplishing the desired therapeutic result.

The new therapeutic toothpaste is effective in that it is carried by the brush to all sections of the gingivae and to cracks or crevices and localized areas, interproximal spaces and pockets, subjecting such areas to the combined action of the chlorophyll, detergent, abrasive, and acid neutralizing ingredients, with particularly effective results. This combined action creates a total environment in the mouth which progressively controls the bacterial population in the mouth and progressively improves gingival conditions.

The abrasive or antacid material such as calcium carbonate may itself be coated with water-soluble chlorophyll or by an absorbed layer thereof, and where such an abrasive is present, with its chlorophyll coating, in the dentifrice, the combination of water-soluble chlorophyll and antacid abrasive and carrier is particularly effective, as well as other water-soluble chlorophyll in solution in the dentifrice.

The invention will be further illustrated by the following examples, but it will be understood that the invention is not limited thereto.

EXAMPLE I

Five tenths of a gram of gum tragacanth and five grams of castile soap powder were carefully ground together into 20 cc. of distilled water. A quantity of a finely ground chlorophyll composition containing 2 grams of sodium magnesium chlorophyllin was then carefully mixed in. Finally 20 cc. of glycerin, 53 grams of precipitated chalk and 1.5 grams of flavoring oils (oil of wintergreen and saccharine to taste) were added and evenly distributed in the mixture to provide a uniform composition. This composition is a paste dentifrice adapted to be applied in the usual manner of using paste dentifrices.

EXAMPLE II

Another paste dentifrice was made exactly as described in Example I, except that in place of the five tenths of a gram of gum tragacanth, five tenths of a gram of pectin was used.

EXAMPLE III

Another paste dentifrice was made as described in Example I, except that in place of the sodium magnesium chlorophyllin 0.1 to 0.2% of sodium copper chlorophyllin was used.

This application is a continuation-in-part of application Serial No. 466,299, filed November 20, 1942, which application was a continuation-in-part of application Serial No. 367,676, filed November 28, 1940, both now abandoned.

What is claimed is:

1. An acid-stabilized dentifrice composition, substantially free of water-insoluble precipitated chlorophyll both in storage and in use, therapeutically effective in the treatment of gingival conditions containing as essential ingredients an inorganic acid neutralizing salt of relatively low solubility in water and 0.02 to 3% by weight of a water soluble chlorophyll, said salt being in an amount sufficient to impart an abrasive action to said composition and at the same time to maintain the pH of said composition sufficiently high to maintain said water soluble chlorophyll in its water soluble and therapeutically effective form.

2. A therapeutic toothpaste as defined in claim 1, containing about 0.1 to 0.2% of a soluble alkali metal chlorophyllin salt.

3. A therapeutic toothpaste as defined in claim 1, containing about 0.1 to 0.2% of sodium magnesium chlorophyllin.

4. A therapeutic toothpaste as defined in claim 1, containing about 0.1 to 0.2% sodium copper chlorophyllin.

5. A composition as defined in claim 1 in which the inorganic [acid] salt is selected from the group consisting of calcium carbonate [,] *and* magnesium carbonate [and insoluble sodium metaphosphate].

6. A composition as defined in claim 5 in which the inorganic salt is calcium carbonate.

7. A composition as defined in claim 5 in which the inorganic salt is magnesium carbonate.

[8. A composition as defined in claim 5 in which the inorganic salt is insoluble sodium metaphosphate.]

9. An acid-stabilized dentifrice composition, substantially free of water-insoluble precipitated chlorophyll both in storage and in use, therapeutically effective in the treatment of gingival conditions containing as essential ingredients an inorganic acid neutralizing abrasive salt of relatively low solubility in water and 0.02 to 3% by weight of a water soluble chlorophyll, said salt being in an amount sufficient to impart an abrasive action to said composition and at the same time to maintain the pH of said composition sufficiently high to maintain said water soluble chlorophyll in its water soluble and therapeutically effective form, the abrasive salt being coated with or having an absorbed layer of the water soluble chlorophyll.

10. An acid-stabilized dentifrice composition, substantially free of water-insoluble precipitated chlorophyll both in storage and in use, therapeutically effective in the treatment of gingival conditions containing as essential ingredients an inorganic acid neutralizing abrasive salt of relatively low solubility in water and from about 0.1% to 0.2% by weight of a water soluble chlorophyll, said salt being in an amount sufficient to impart an abrasive action to said composition and at the same time to maintain the pH of said composition sufficiently high to maintain said water soluble chlorophyll in its water soluble and therapeutically effective form, the abrasive salt being coated with or having an absorbed layer of the water soluble chlorophyll.

References Cited in the file of this patent or the original patent

UNITED STATES PATENTS

| | | |
|---|---|---|
| 1,551,638 | Brady | Sept. 1, 1925 |
| 1,645,852 | Brownlee | Oct. 18, 1927 |
| 1,691,504 | Vogt | Nov. 13, 1928 |
| 2,054,742 | Elbel | Sept. 15, 1936 |
| 2,120,667 | Gruskin | June 14, 1938 |
| 2,225,284 | McDonald | Dec. 17, 1940 |

FOREIGN PATENTS

| | | |
|---|---|---|
| 161,640 | Australia | Mar. 3, 1955 |
| 444,276 | Great Britain | Mar. 18, 1936 |

OTHER REFERENCES

Welwart: "Antiseptics for Tooth Pastes," The Mfg. Chemist, February 1933, pp. 45 and 48.

Bennett: "The Cosmetic Formulary," N. Y., 1937, p. 211.

Amer. Jour. of Surgery, July 1940, pp. 54, 55 (Gruskin: Chlorophyll).

Amer. Perf. and Ess. Oil Review, October 1949, p. 281.

The N. Y. Jour. of Dentristry, January 1950, pp. 3 to 5.

The Military Surgeon, May 1950, pp. 352-354.

Jour. Amer. Dent. Assn., vol. 40, May 1950, p. 625 ("Group C").

Consumer Rpts, October 1950, "Chlorophyll, the Latest Drug Fad," p. 458.